(12) United States Patent
Suwald et al.

(10) Patent No.: US 10,609,012 B2
(45) Date of Patent: Mar. 31, 2020

(54) METHOD OF OPERATING A SECURITY TOKEN, COMPUTER PROGRAM PRODUCT AND SECURITY TOKEN

(71) Applicant: NXP B.V., Eindhoven (NL)

(72) Inventors: Thomas Suwald, Hamburg (DE); Arne Burghardt, Hamburg (DE)

(73) Assignee: NXP B.V., Eindhoven (NL)

( * ) Notice: Subject to any disclaimer, the term of this patent is extended or adjusted under 35 U.S.C. 154(b) by 484 days.

(21) Appl. No.: 14/527,680

(22) Filed: Oct. 29, 2014

(65) Prior Publication Data

US 2015/0121499 A1   Apr. 30, 2015

(30) Foreign Application Priority Data

Oct. 29, 2013   (EP) .................................. 13190731

(51) Int. Cl.
*G06F 7/04* (2006.01)
*H04L 29/06* (2006.01)
(Continued)

(52) U.S. Cl.
CPC .............. *H04L 63/08* (2013.01); *G06F 21/32* (2013.01); *G06F 21/35* (2013.01);
(Continued)

(58) Field of Classification Search
CPC .......... G06F 21/31; G06F 21/34; G06F 21/35; G06F 21/50; H04L 63/08; H04L 63/0853
See application file for complete search history.

(56) References Cited

U.S. PATENT DOCUMENTS 8,327,141 B2 * 12/2012 Vysogorets ............. G06F 21/34
713/168
9,095,729 B2 * 8/2015 John ..................... A61N 1/3785
(Continued)

FOREIGN PATENT DOCUMENTS

EP       2 541 791 A2      1/2013
EP         2541995 A1 *    1/2013  ........... H04B 5/0037
(Continued)

OTHER PUBLICATIONS

Extended European Search Report for patent appln. No. 13190731.3 (dated Mar. 24, 2014).

*Primary Examiner* — Shewaye Gelagay
*Assistant Examiner* — Carlton Johnson

(57) ABSTRACT

There is provided a method of operating a security token, said security token comprising a secure element and a microcontroller unit being coupled to said secure element, wherein: the secure element receives an authentication command from a host device while the microcontroller unit is in a first sleep state; the secure element decodes the authentication command, sends a corresponding authentication request to the microcontroller unit and subsequently enters into a second sleep state; the microcontroller unit wakes up upon receiving the authentication request and subsequently determines an amount of available power; the microcontroller unit processes the authentication request only if the amount of available power exceeds a threshold. Furthermore, a corresponding computer program product and a corresponding security token are provided.

16 Claims, 3 Drawing Sheets

(51) Int. Cl.
    *G06F 21/35*     (2013.01)
    *H04W 52/02*     (2009.01)
    *G06F 21/32*     (2013.01)

(52) U.S. Cl.
    CPC ..... *H04W 52/028* (2013.01); *H04W 52/0229* (2013.01); *Y02D 70/166* (2018.01)

(56) References Cited

U.S. PATENT DOCUMENTS

| | | |
|---|---|---|
| 2004/0082362 A1 | 4/2004 | Peng et al. |
| 2009/0098914 A1* | 4/2009 | Martin-Cocher ............................ H04W 52/0261 455/572 |
| 2012/0038464 A1 | 2/2012 | Stromberger |
| 2012/0244805 A1 | 9/2012 | Haikonen et al. |
| 2013/0084803 A1 | 4/2013 | Hall et al. |
| 2014/0006799 A1* | 1/2014 | Zmudzinski ........ G06F 12/1408 713/189 |
| 2014/0120832 A1* | 5/2014 | Confer ................. H04B 5/0031 455/41.1 |

FOREIGN PATENT DOCUMENTS

| | | |
|---|---|---|
| EP | 2 541 995 A1 | 2/2013 |
| EP | 2 575 084 A1 | 4/2013 |
| WO | 2007/011185 A1 | 1/2007 |

\* cited by examiner

| Step | Action By | Action | Secure Element | MCU |
|---|---|---|---|---|
| 1 | User | Insert smart card into the field | | - undefined (remain in reset state) |
| 2 | Secure Element | | - wakes up<br>- starts communication with host device | - undefined (remain in reset state) |
| 3 | MCU | | - idle (sleep state) | - if valid operating voltage detected then<br>  - execute reset procedure<br>  - execute program that causes MCU to enter into sleep state |
| 4 | Secure Element | Smart card is idle in the field | - send WTX ("still alive") message<br>- sleep 600 ms | - idle (sleep state) |
| 5 | Host Application | Send authentication command | - idle (sleep state)<br>- listening to host interface | - idle (sleep state) |
| 6 | Secure Element | Decode authentication command and send authentication request | - wakes up and decodes command<br>- sends authentication request to MCU<br>- returns to idle mode (sleep state) | - idle (sleep state)<br>- UART activity wakes up MCU from sleep state |

Fig. 3A

| Step | Action By | Action | Secure Element | MCU |
|---|---|---|---|---|
| 7 | MCU | Wake-up and perform user interface action | - wait for response in idle mode (sleep state) | - perform user interface action only if power level is sufficient<br>- otherwise wait and monitor power level<br>- return user credentials to Secure Element<br>- return to sleep state |
| 8 | Secure Element | Transmit authentication result | - check data interface<br>- if data sent then wake-up and check for user credentials<br>- if user credentials found then verify them and return corresponding authentication result to host device | - remain idle (sleep state) |
| 9 | Host Application | Receive authentication result | | - remain idle (sleep state) |

Fig. 3B

METHOD OF OPERATING A SECURITY TOKEN, COMPUTER PROGRAM PRODUCT AND SECURITY TOKEN

CROSS-REFERENCE TO RELATED APPLICATIONS

This application claims the priority under 35 U.S.C. § 119 of European patent application no. 13190731.3, filed on Oct. 29, 2013, the contents of which are incorporated by reference herein.

FIELD

The present disclosure relates to a method of operating a security token. Furthermore, the present disclosure relates to a corresponding computer program product and to a corresponding security token.

BACKGROUND

Security tokens, such as smart cards, are widely accepted tools for making payments, and, more generally, for carrying out transactions which require an adequate protection of sensitive data. In particular, contactless smart cards have become increasingly popular, for example in the public transportation sector. Contactless smart cards may, among others, be read out by mobile devices—more specifically by mobile devices enabled for near field communication (NFC) such as smart phones and tablets—in order to support mobile transactions. An NFC-enabled mobile device may for instance facilitate an online purchase of a product, while a contactless smart card arranged to interact with said mobile device may be used for user authentication, in particular for the verification of user credentials. Examples of such scenarios have been described in the European patent application titled "Security token and authentication system", filed by applicant NXP B.V. on 14 Feb. 2012 and published as EP 2 575 084 A1 on 3 Apr. 2013.

EP 2 575 084 A1 describes techniques for entering a secret into a security token using an embedded tactile sensing user interface with the purpose of verifying the secret against a stored representation of the same secret. In particular, an embodiment of the security token comprises a tactile sensing user interface being arranged to receive a user-encoded secret, a decoding unit being arranged to generate a decoded secret by decoding the user-encoded secret, a comparison unit being arranged to compare the decoded secret with a copy of the secret stored in the token in order to verify the authenticity of a user. Thereby, the security token provides on-card matching functionality.

In particular, in column 39, line 16 to column 40, line 15 and the corresponding FIGS. 62, 63, 64, of EP 2 575 084 A1, illustrative scenarios are described wherein an NFC-enabled mobile device interacts with the security token in order to facilitate and perform online transactions. More specifically, the smart phone depicted in FIG. 62 performs authentication for an online transaction. The security token is brought into close proximity of the smart phone, which is equipped with an NFC interface. A browser plug-in or a JAVA applet may enable access to the NFC interface and may enable authentication of an online payment application through the security token. For example, the security token may be configured to enter a four-character password. A request to attach the security token and to enter the authentication information may be displayed by a message on the smart phone's screen. The user may then place the security token on the smart phone. Subsequently, the security token may be powered up through the smart phone's NFC interface. The user may then enter required authentication information by a sequence of tactile patterns directly on the surface of the security token. The authentication information may be reassembled by a tactile pattern decoding unit of the security token based on the sequence of tactile patterns entered by the user. The authentication information may be verified directly on the security token by its security controller and the authentication result may be returned in encrypted form to the browser plug-in on the smart phone. As an alternative approach the authentication information may be sent in encrypted form through a browser plug-in directly to a remote service for decryption and verification. Accordingly, the user may utilize his personal security token without risking that secret information might be logged by an unauthorized process on the smart phone. FIG. 64 illustrates a similar scenario. In this scenario, a smart phone performs authentication for an online transaction by interacting with an electronic ID card with a tactile sensor user interface. Thus, in this scenario the security token is an electronic ID card with an embedded tactile sensor which may be used as a security proxy.

In these scenarios problems may emerge, because NFC-enabled mobile devices typically generate a relatively weak radio frequency (RF) field in order to minimize their power consumption and in order to avoid depletion of their internal battery. For authentication systems based on relatively complex security tokens, such as multi-chip smart cards, the strength of the RF field is typically too low to ensure a stable operation of the security tokens. Therefore, it is desirable to control the power consumption of said security tokens.

EP 2 541 995 A1 describes a technique for controlling the power consumption of a host device, for example a mobile device. Basically, an NFC device integrated in said host device selectively powers on and off operating components of the host device. In particular, EP 2 541 995 A1 describes an apparatus for harvesting and using power in a near field communications mode, which includes a host device with operating components. A first NFC device is contained in the host device and is configured to be selectively coupled to one of the operating components. The first NFC device harvests energy from a second NFC device and converts the harvested energy to electrical power. The first NFC device receives information from the second NFC device and powers on an operating component as a function of the information received from the second NFC device. The first NFC device transfers data to or from the operating component when the operating component is powered on. The first NFC device powers off the operating component when the transfer of data between the first NFC device and the operating component has been completed. Thus, EP 2 541 995 A1 describes a general technique for reducing battery depletion in electronic devices.

However, in the specific case of security tokens, which usually do not have an internal battery that may serve as a fall-back power supply in case the power consumption is not sufficiently reduced or stabilized, there may be a need for a more rigorous control of the power consumption.

SUMMARY

There is provided a method of operating a security token, said security token comprising a secure element and a microcontroller unit being coupled to said secure element, wherein: the secure element receives an authentication command from a host device while the microcontroller unit is in a first sleep state; the secure element decodes the authentication command, sends a corresponding authentication request to the microcontroller unit and subsequently enters into a second sleep state; the microcontroller unit wakes up upon receiving the authentication request and subsequently determines an amount of available power; the microcontroller unit processes the authentication request only if the amount of available power exceeds a threshold.

According to an illustrative embodiment, the microcontroller unit processes the authentication request by controlling a user interface for capturing user credentials.

According to another illustrative embodiment, when the microcontroller unit has captured the user credentials through said user interface, the microcontroller unit sends said user credentials to the secure element and subsequently returns to the first sleep state.

According to a further illustrative embodiment, the secure element wakes up upon receiving the user credentials and verifies said user credentials in order to generate an authentication result.

According to a further illustrative embodiment, the secure element, after having generated the authentication result, sends the authentication result to the host device and subsequently returns to the second sleep state.

According to a further illustrative embodiment, the microcontroller unit determines the amount of available power by measuring the voltage present on an antenna of said security token.

According to a further illustrative embodiment, the microcontroller unit, when the amount of available power does not exceed the threshold, further monitors said amount of available power and processes the authentication request if the amount of available power changes such that it exceeds the threshold.

According to a further illustrative embodiment, the secure element is in a third sleep state prior to receiving the authentication command, and the secure element wakes up upon receiving said authentication command.

According to a further illustrative embodiment, the microcontroller unit is in a reset state prior to being in the first sleep state.

According to a further illustrative embodiment, the threshold is predetermined.

Furthermore, there is provided a computer program product comprising program elements which, when being executed by a secure element or a microcontroller unit, carry out or control steps of a method as claimed in any preceding claim.

Furthermore, there is provided a security token comprising a secure element and a microcontroller unit being coupled to said secure element, wherein: the secure element is arranged to receive an authentication command from a host device while the microcontroller unit is in a first sleep state; the secure element is arranged to decode the authentication command, to send a corresponding authentication request to the microcontroller unit and to subsequently enter into a second sleep state; the microcontroller unit is arranged to wake up upon receiving the authentication request and to subsequently determine an amount of available power; the microcontroller unit is arranged to process the authentication request only if the amount of available power exceeds a threshold.

According to a further illustrative embodiment, said security token is a smart card.

DESCRIPTION OF DRAWINGS

Embodiments will be described in more detail with reference to the appended drawings, in which:

FIGS. 3A and 3B show an illustrative example of a sequence of events in an authentication system of the kind set forth.

DESCRIPTION OF EMBODIMENTS

Figure 1:
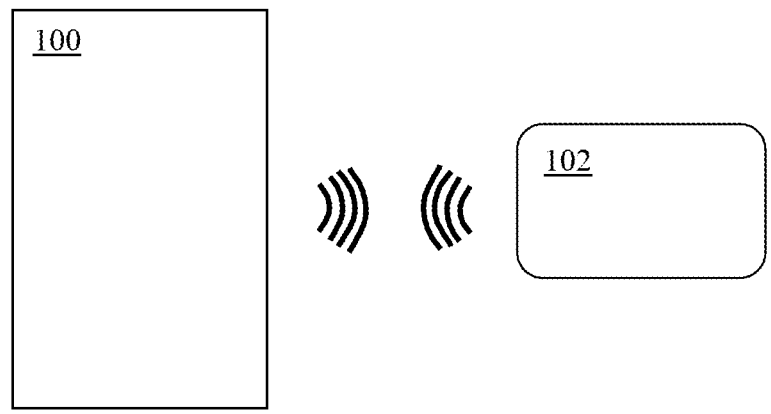
FIG. 1 shows an illustrative embodiment of an authentication system.

FIG. 1 shows an illustrative embodiment of an authentication system. The authentication system comprises a mobile device 100 and a security token, in particular a smart card 102. The mobile device 100 may for example be an NFC-enabled mobile device and the smart card 102 may be a so-called contactless smart card. The mobile device 100 is arranged to interact with the smart card 102 via short-range RF communication. As described in detail in the background section, in operation the smart card 102 may be used to facilitate mobile transactions performed by the mobile device 100 by capturing and verifying user credentials and by sending a corresponding authentication result to the mobile device 100.

Typically, a smart card 102 of the kind set forth comprises a secure element and a microcontroller unit. A secure element in a smart card is often implemented as a tamper-proof integrated circuit with (pre-) installed smart-card-grade applications, for instance payment applications, which have a prescribed functionality and a prescribed level of security. For example, the secure element may be an integrated circuit of the so-called "SmartMX" or "SmartMX2" series of IC's, produced by the applicant NXP B.V.

The inventors have realized that the amount of power currently provided by NFC-enabled mobile devices is often not sufficiently high to enable a proper operation of a secure element and a microcontroller unit at the same time. Also, they expect that for instance manufacturers of smart phones will insist on further power-level reductions in order to preserve more battery power, which will aggravate the problem. Although minimum field strength of 1.5 A/m is a standardized requirement, the measurement conditions for this parameter have unfortunately not been prescribed with sufficient precision. As a consequence small smart-phone antennas may comply with the standard, but the minimum required field strength is usually only achieved at a small spot inside the antenna. Beyond that spot the field strength does not meet the standard requirements. Secure elements are commonly designed to comply with these power levels, but multifunctional smart cards have higher power demands, especially for the supply of power to microcontroller units which control, among others, the relatively complex user interfaces embedded in said smart cards. Furthermore, the inventors have realized that it may also be desirable in other scenarios to balance the amount of power supplied to secure elements and microcontroller units embedded in security tokens. For example, if a security token is powered by a standard contactless RFID reader, then the amount of delivered power may be higher than in case of an NFC-enabled mobile device. Nevertheless, it may be desirable to supply higher currents to either one of the secure element or the microcontroller unit. Higher supply currents may be required for the secure element in case of advanced cryptographic operations, for example. Higher supply currents may be required for the microcontroller unit in case of higher display drive currents—i.e. if the user interface comprises a display—or in case of very high data rates.

Figure 2:
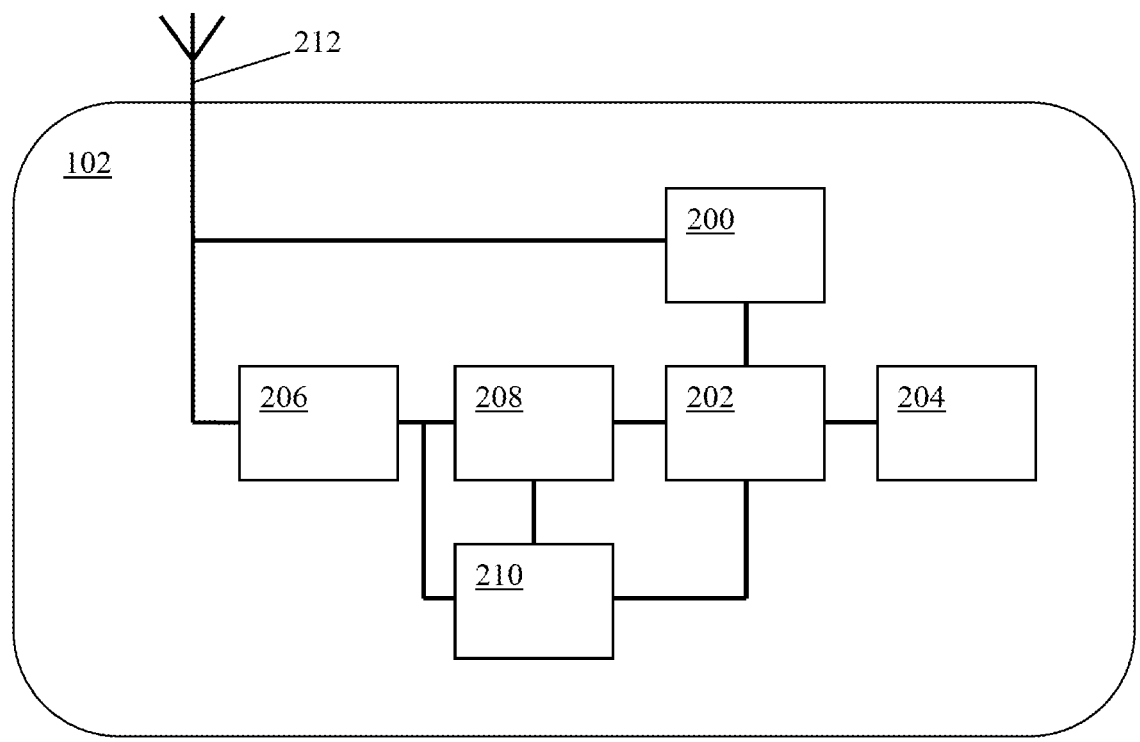
FIG. 2 shows an illustrative embodiment of a security token.

FIG. 2 shows an illustrative embodiment of a security token. In this embodiment, the security token is a contactless smart card 102. The smart card 102 comprises a microcontroller unit 202 which is connected to a secure element 200, a user interface 204, a power converter 208 and an analog-to-digital converter 210. The power converter 208 and the analog-to-digital converter 210 are both connected to a bridge rectifier 206. The bridge rectifier 206 and the secure element 200 are both connected to an RFID antenna 212.

In operation, power is delivered to the secure element 200 and the microcontroller unit 202 through the RFID antenna 212. In the case of the microcontroller unit 202, the power is delivered through the bridge rectifier 206 and the power converter 208. The term "powered by the field" is often used to characterize this type of power supply. The secure element 200 uses the delivered power for instance to perform cryptographic operations or to process authentication commands, which are typically also received via the RFID antenna 212. The microcontroller unit 202 uses the delivered power among others to control the user interface 204.

Now, with reference to both FIG. 1 and FIG. 2, an embodiment of a method of operating the smart card 102 in accordance with the present disclosure is described, which comprises the following steps: the secure element 200 receives an authentication command from the mobile device 100 while the microcontroller unit 202 is in a first sleep state; the secure element 200 decodes the authentication command, sends a corresponding authentication request to the microcontroller unit 202 and subsequently enters into a second sleep state; the microcontroller unit 202 wakes up upon receiving the authentication request and subsequently determines an amount of available power; the microcontroller unit 202 processes the authentication request only if the amount of available power exceeds a threshold. Thereby, it is achieved that the delivered power is balanced, to an acceptable extent, between the secure element 200 and the microcontroller unit 202. Furthermore, it is achieved that the activity level of the microcontroller unit 202 matches, again to an acceptable extent, the power requirements of the microcontroller unit 202. The steps may be performed by different program elements, e.g. by means of software modules, executable by the secure element 200 and the microcontroller unit 202, respectively. It is noted that the term "sleep state" refers to a state in which a device or component consumes significantly less power than in a normal operational state; however, it is not completely switched off, and therefore it may still perform a limited number of functions, such as receiving signals or messages.

FIGS. 3A and 3B show an illustrative example of a sequence of events in an authentication system of the kind set forth. It is noted that the operations performed by the secure element and the microcontroller unit (MCU), respectively, are merely examples. The presence of specific operations in the shown sequence does not imply that these operations represent mandatory or essential steps of a method of operating the smart card.

The operations shown in FIGS. 3A and 3B may be implemented by means of software executable by the secure element and software executable by the MCU. Both software implementations are configured to provide the functionality described in the following illustrative sequence of events.

The user places a smart card on an NFC-enabled smart phone acting as a host device or on a contactless host interface, i.e. an RFID reader.

The secure element wakes up first and starts communicating with the host device. The MCU is still in the reset state until a stable operating voltage is reached.

The MCU performs its reset procedure and starts executing a program which executes the global initialization phase, whereafter the MCU is put into a sleep state.

The secure element holds the connection to the host device by means of a periodic communication, e.g. a so-called waiting time extension (WTX) message. The MCU is still sleeping.

The host device sends an authentication command to the smart card.

The secure element receives the message, decodes it and sends an authentication request to the MCU. Afterwards it enters the sleep state and waits for an answer from the MCU.

The MCU wakes up in case of an activity on the communication link to the secure element. After reception of the authentication request it starts checking the antenna voltage, which is an indication for the available amount of power. If this power level is sufficient, it activates the user interface. If the power level is too low, it may stop all activities and monitor the power level until said level is sufficient. If the power level is sufficient, then the authentication request may be processed. The user interface may comprise a tactile sensor capturing tactile patterns entered by the user and a tactile pattern decoder that may provide an authentication string representing user credentials. Such a user interface has been described in EP 2 541 995 A1. Upon availability the MCU sends the user credentials to the secure element for verification and enters into the sleep state again.

The secure element verifies the received user credentials by comparing them with a stored reference pattern and sends the resulting authentication result in a message, which may be encrypted, to the host device. Subsequently it enters into the sleep state again.

The host device receives the authentication result and performs required actions in accordance therewith.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 mobile device
102 smart card
200 secure element
202 microcontroller unit
204 user interface
206 bridge rectifier
208 power converter
210 analog-to-digital converter
212 RFID antenna

The invention claimed is:

1. A method of operating a security token, said security token comprising a secure element and a microcontroller unit coupled to said secure element, wherein:
the secure element receives an authentication command from a host device while the microcontroller unit is in a first sleep state and the secure element is in a third sleep state prior to receiving the authentication command;
the secure element decodes the authentication command, sends a corresponding authentication request to the microcontroller unit, and subsequently enters into a second sleep state, wherein power is restricted, but not completely switched off, to the microcontroller unit in the first sleep state and the secure element in both the second sleep state and the third sleep state;
the microcontroller unit wakes up upon receiving the authentication request and subsequently determines an amount of available power from an antenna of the security token; and
the microcontroller unit processes the authentication request only after the amount of available power exceeds a threshold.

2. The method as claimed in claim 1, wherein the microcontroller unit processes the authentication request by controlling a user interface for capturing user credentials.

3. The method as claimed in claim 2, wherein, when the microcontroller unit has captured the user credentials through said user interface, the microcontroller unit sends said user credentials to the secure element and subsequently returns to the first sleep state.

4. The method as claimed in claim 3, wherein the secure element wakes up upon receiving the user credentials and verifies said user credentials in order to generate an authentication result.

5. The method as claimed in claim 4, wherein the secure element, after having generated the authentication result, sends the authentication result to the host device and subsequently returns to the second sleep state.

6. The method as claimed in claim 1, wherein the microcontroller unit determines the amount of available power by measuring a voltage present on the antenna of said security token.

7. The method as claimed in claim 1, wherein the microcontroller unit, when the amount of available power does not exceed the threshold, further monitors said amount of available power and processes the authentication request after the amount of available power changes such that it exceeds the threshold.

8. The method as claimed in claim 1, wherein the secure element wakes up upon receiving said authentication command.

9. The method as claimed in claim 1, wherein the microcontroller unit is in a reset state prior to being in the first sleep state.

10. The method as claimed in claim 1, wherein the threshold is predetermined.

11. The method of claim 1, wherein power is delivered from the antenna to the microcontroller unit through a bridge rectifier and a power converter.

12. A non-transitory computer readable medium comprising instructions which, when being executed by a secure element and a microcontroller unit, operate a security token, comprising:
instructions for receiving, in the secure element, an authentication command from a host device while the microcontroller unit is in a first sleep state and the secure element is in a third sleep state prior to receiving the authentication command;
instructions for decoding, in the secure element, the authentication command;
instructions for sending a corresponding authentication request from the secure element to the microcontroller unit and subsequently entering the secure element into a second sleep state, wherein power is restricted, but not completely switched off, to the microcontroller unit in the first sleep state and the secure element in both the second sleep state and the third sleep state;
instructions for waking up the microcontroller unit upon receiving the authentication request;
instructions for, in the microcontroller unit, subsequently determining an amount of available power from an antenna of the security token; and
instructions for, in the microcontroller unit, processing the authentication request only after the amount of available power exceeds a threshold.

13. The non-transitory computer readable medium of claim 12, further comprising:
instructions for measuring a voltage present on the antenna of said security token.

14. A security token comprising a secure element and a microcontroller unit being coupled to said secure element, wherein:
the secure element is configured to receive an authentication command from a host device while the microcontroller unit is in a first sleep state and the secure element is in a third sleep state prior to receiving the authentication command;
the secure element is configured to decode the authentication command, to send a corresponding authentication request to the microcontroller unit and to subsequently enter into a second sleep state, wherein power is restricted, but not completely switched off, to the microcontroller unit in the first sleep state and the secure element in both the second sleep state and the third sleep state;
the microcontroller unit is configured to wake up upon receiving the authentication request and to subsequently determine an amount of available power from an antenna of the security token; and
the microcontroller unit is configured to process the authentication request only after the amount of available power exceeds a threshold.

15. The security token as claimed in claim 14, wherein said security token is a smart card.

16. The security token of claim 14, wherein the microcontroller unit determines the amount of available power by measuring a voltage present on the antenna of said security token.

* * * * *